US012492800B1

(12) United States Patent
Li

(10) Patent No.: US 12,492,800 B1
(45) Date of Patent: Dec. 9, 2025

(54) DETACHABLE AND FOLDABLE ASSEMBLED METAL LAMP SHADE

(71) Applicant: Xiaofeng Li, Fuzhou (CN)

(72) Inventor: Xiaofeng Li, Fuzhou (CN)

( * ) Notice: Subject to any disclaimer, the term of this patent is extended or adjusted under 35 U.S.C. 154(b) by 0 days.

(21) Appl. No.: 19/082,241

(22) Filed: Mar. 18, 2025

(30) Foreign Application Priority Data

Mar. 5, 2025 (CN) ......................... 202520372352.3

(51) Int. Cl.
*F21V 1/24* (2006.01)
*F21V 1/00* (2006.01)

(52) U.S. Cl.
CPC . *F21V 1/00* (2013.01); *F21V 1/24* (2013.01)

(58) Field of Classification Search
CPC ............. F21V 1/24; F21V 1/146; F21L 19/00
See application file for complete search history.

(56) References Cited

U.S. PATENT DOCUMENTS 86,987 A * 2/1869 Laws ........................ F21V 1/00 362/360
1,477,991 A * 12/1923 Baker ....................... F21V 1/18 362/360
5,571,280 A * 11/1996 Lehrer ...................... F21V 1/24 493/950
6,206,551 B1 * 3/2001 Stubblefield, Jr. ........ F21V 7/18 362/346
2018/0135828 A1 * 5/2018 Minsky ..................... F21V 1/22

* cited by examiner

*Primary Examiner* — Sean P Gramling
(74) *Attorney, Agent, or Firm* — Jose Cherson Weissbrot

(57) ABSTRACT

The present invention relates to the technical field of metal lamp shades, and more particularly, relates to a detachable and foldable assembled metal lamp shade, which comprises a shade body, an end cover, and a handle. The shade body is a tubular structure provided with a top opening or openings at both ends, and includes at least one flexible metal plate. First and second side edges are vertically disposed on both sides of the flexible metal plate, and the first and second side edges are detachably connected to enclose the flexible metal plate to form the shade body. The flexible metal plates can be assembled into the shade body through a detachable connection of the first and second side edges, providing a convenient assembly method and ease of disassembly into flexible metal plates for portability.

10 Claims, 13 Drawing Sheets

DETACHABLE AND FOLDABLE ASSEMBLED METAL LAMP SHADE

CROSS-REFERENCE TO RELATED APPLICATIONS

The application claims priority to Chinese patent application No. 202520372352.3, filed on Mar. 5, 2025, the entire contents of which are incorporated herein by reference.

TECHNICAL FIELD

The invention relates to the technical field of metal lamp shades, in particular to a detachable and foldable assembled metal lamp shade.

BACKGROUND ART

Lamp shades, as peripheral components of lighting systems, are typically designed with a primary focus on optical performance and structural stability, yet they exhibit notable shortcomings in terms of portability and transport adaptability. Traditional lamp shades are often made from rigid materials (such as glass, metal, or integrally molded plastic shells), and their fixed forms result in large volumes, making them difficult to adapt to modern logistics or personal carrying scenarios. For instance, patent JP2020-56789A proposes a detachable frame lamp shade that reduces packaging size through a split structure, but its component interfaces are complex and require additional tools for assembly, thereby diminishing user operational efficiency. Patent DE102017008945B3, on the other hand, employs a flexible fabric lamp shade, which, while capable of being rolled up for storage, lacks a rigid support structure and is prone to deformation or scratches under pressure during transport. Consequently, with a growing demand for outdoor lighting and temporary exhibitions, there is an urgent market need for a lamp shade that can be quickly assembled while balancing lightweight design and damage resistance, in order to reduce production and transportation costs and enhance usage flexibility.

SUMMARY OF THE INVENTION

To address the issues outlined in the background technology, the present invention provides a detachable and foldable assembled metal lamp shade, which offers protective performance while facilitating production and transportation, effectively reducing production and transportation costs. Additionally, it allows for quick and convenient assembly during use.

The solution adopted by the invention to solve its technical problems is as follows: a detachable and foldable assembled metal lamp shade, comprising:

a shade body, which is a tubular structure provided with a top opening or openings at both ends, including at least one flexible metal plate, wherein both sides of the flexible metal plate are vertically disposed with first and second side edges, and the first and second side edges are detachably connected to enclose the flexible metal plate to form the shade body;

an end cover, which is fitted on the opening at the end of the shade body, wherein the end cover includes a cover plate and a side wall surrounding a peripheral edge of the cover plate, and the side wall and the cover plate form a fixing groove that matches a cross-sectional structure of the shade body, and the end of the shade body is embedded in the fixing groove;

a handle, which is a rigid or flexible structure with flat insertion heads at both ends, wherein the side wall is provided with first connection holes at corresponding positions, and the shade body is provided with second connection holes at positions corresponding to the first connection holes and the insertion heads are sequentially inserted into the first and second connection holes.

Further, the flexible metal plate includes at least three sequentially connected metal side plates, with flexible connecting ribs provided between two adjacent metal side plates of the least three metal side plates for connection and bending.

Further, the shade body further includes a bottom support plate, wherein two flexible metal plates are arranged opposite to each other on upper and lower sides or left and right sides of the bottom support plate, a connecting portion for folding is connected between the flexible metal plates and the bottom support plate, during assembly of the shade body, the two flexible metal plates are folded onto the surface of the bottom support plate, and the two flexible metal plates and the bottom support plates are connected to each other to form the shade body with the top opening.

Further, a buckle assembly are provided at edges of the first and second side edges for a mutual connection.

Further, the buckle assembly includes a connection port on the first side edge and a connection piece on the second side edge, wherein the connection piece corresponds to the connection port, and during assembly of the shade body, the connection piece is inserted into the connection port.

Further, the connection piece is provided with a buckle portion for reversely buckling into the connection port.

Further, the end cover includes a top cover fitted on top of the shade body and a bottom cover fitted on bottom of the shade body, wherein the handle is connected to both sides of the top cover, and a side wall of the bottom cover is provided with a connector inserted into the first connection hole and connected to the second connection hole.

Further, an installation port is provided on a surface of the cover plate of the top cover.

Further, an edge of the installation port is provided with positioning notches.

Further, a hollow portion is provided through a surface of the flexible metal plate for projection.

In summary, beneficial effects of the invention are as follows:

1. By arranging the shade body formed from spliced flexible metal plates, the invention achieves a lamp shade with good protective effects, and the flexible metal plates can be directly stamped and cut during production, resulting in a convenient manufacturing process. Moreover, a plate-like structure of the flexible metal plates can effectively reduce a transportation space occupied, facilitating transport.

2. By providing the first and second side edges on both sides of the flexible metal plate, the invention allows the flexible metal plate to be assembled into the shade body through the detachable connection of the first and second side edges, providing a convenient assembly method and the first side edge and the second side edge are detachably connected for ease of disassembly into flexible metal plates for portability.

3. By setting the end cover, the invention ensures that after the flexible metal plates are assembled into the shade body, the end cover can be fitted on the end of the shade body to fix it, enhancing a stability of the shade body formed by the flexible metal plates. Additionally, the end cover provides protection for an interior of the shade body, thereby improving an overall protective performance of the lamp shade.

The above description is merely an overview of the technical solutions of the invention. To understand the technical means of the invention more clearly, it can be implemented according to a content of the specification. Furthermore, to make the above and other objectives, features, and advantages of the invention more apparent and understandable, preferred embodiments are described in detail below with reference to accompanying drawings.

Figure 1:
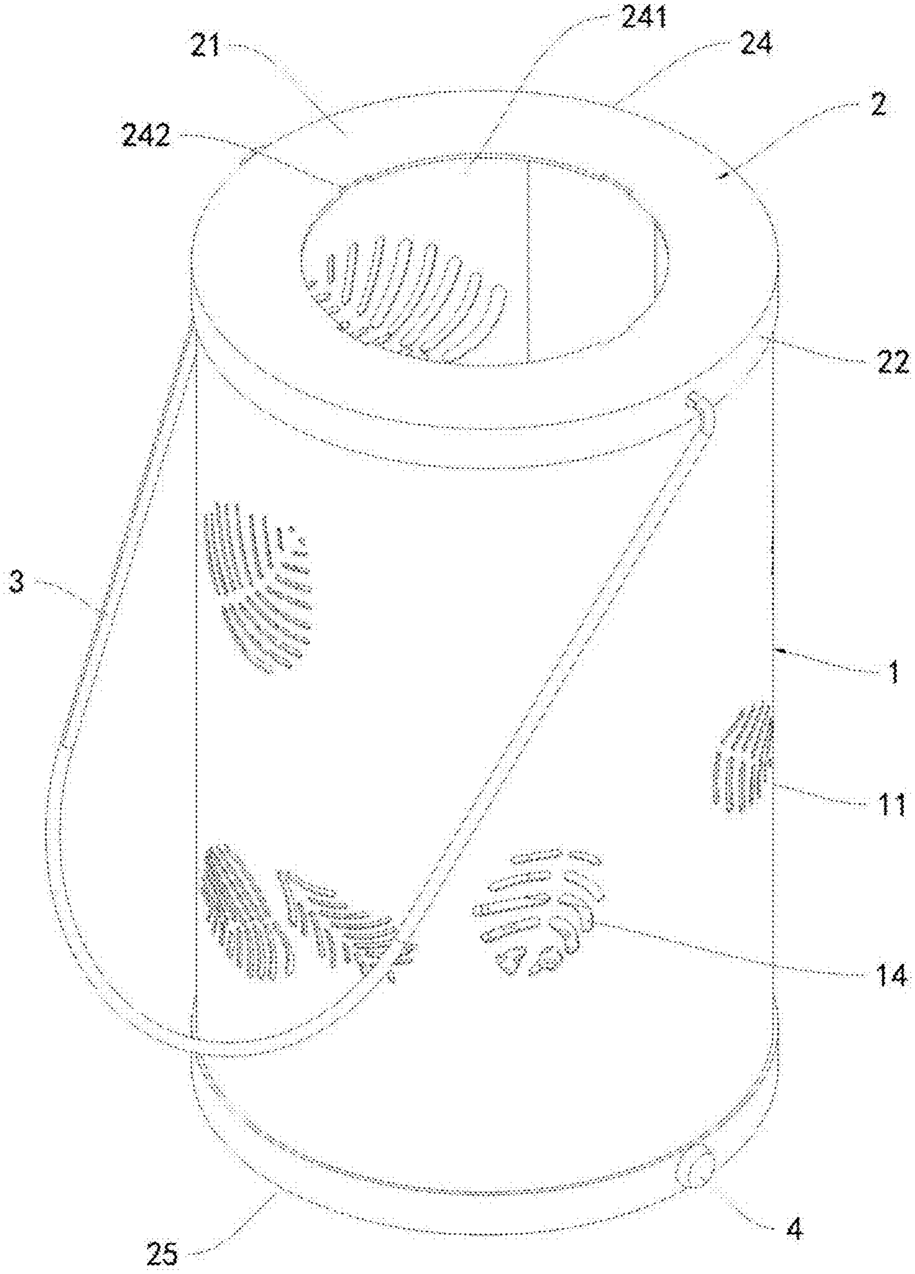
FIG. 1 is a schematic structural diagram of Embodiment 1.

In the drawings: 1. Shade body; 11. Flexible metal plate; 111. First side edge; 112. Second side edge; 113. Second connection hole; 114. Metal side plate; 115. Flexible connecting rib; 116. Connection port; 117. Connection piece; 118. Buckle portion; 12. Bottom support plate; 13. Connecting portion; 14. Hollow portion; 2. End cover; 21. Cover plate; 22. Side wall; 221. First connection hole; 23. Fixing groove; 24. Top cover; 241. Installation port; 242. Positioning notch; 25. Bottom cover; 3. Handle; 31. Insertion head; 4. Connector.

DETAILED DESCRIPTION OF THE INVENTION

To make the content of the present invention easier to understand clearly, the invention is further described below in conjunction with specific embodiments and accompanying drawings.

It should be noted that the terms “center,” “upper,” “lower,” “front,” “rear,” “left,” “right,” “inner,” “outer,” etc., used in this document indicate orientations or positional relationships based on the orientations or positional relationships shown in the drawings. These terms are used solely for the convenience of describing the invention and simplifying the description, rather than indicating or implying that the referred devices or components must have specific orientations or be constructed and operated in specific orientations. Therefore, they should not be construed as limitations on the invention. Unless otherwise specified, the term “multiple” means two or more.

Unless otherwise explicitly defined and limited, the terms “install,” “connected,” and “connection” should be interpreted broadly. For example, a connection may be fixed, detachable, or integral; it may be mechanical, electrical, it may be direct or indirect which is achieved through an intermediate medium, or it may be an internal connection between two components. For those skilled in the art, the specific meanings of the above terms in the context of the invention can be understood based on specific circumstances.

Embodiment 1

Figure 2:
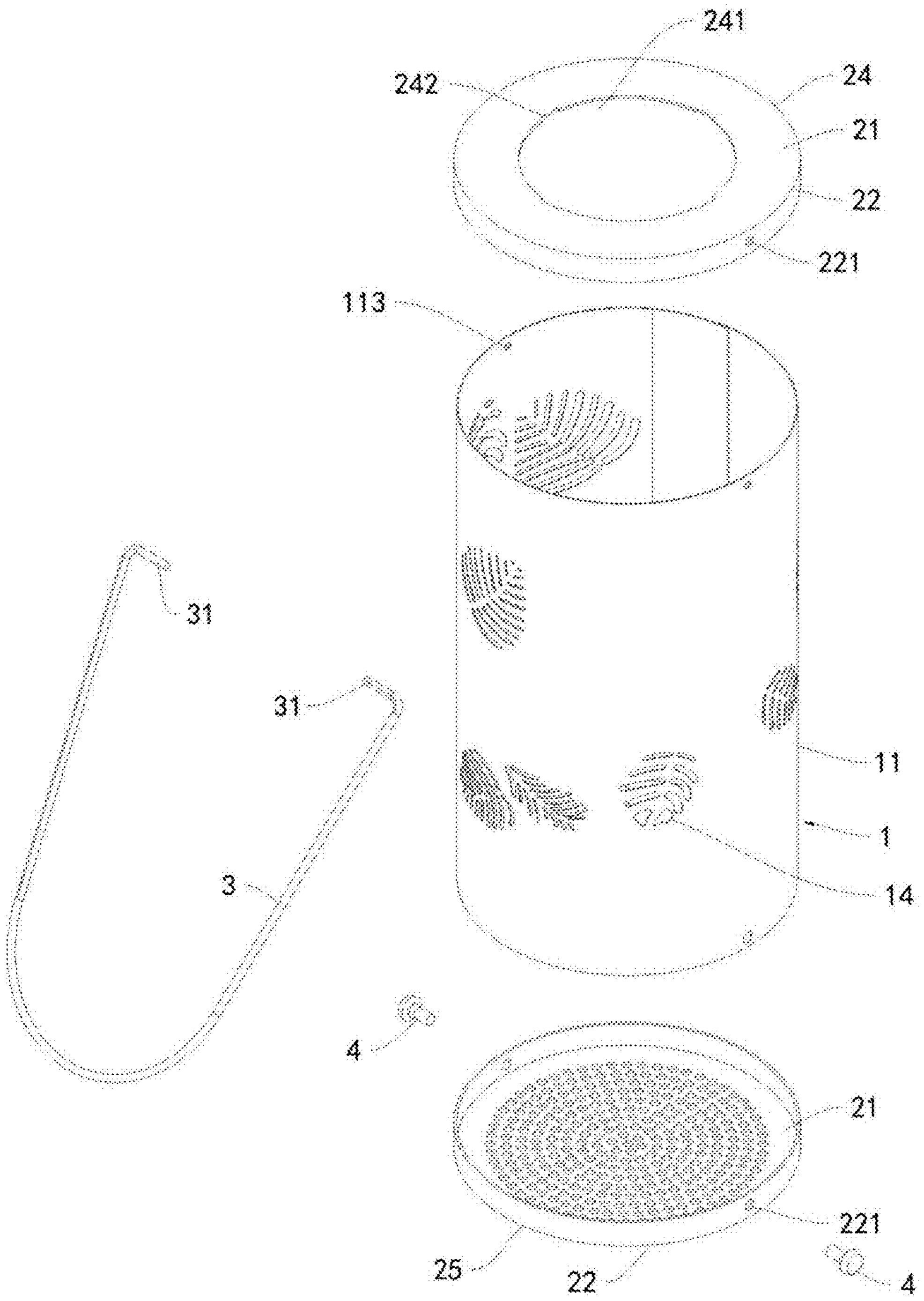
FIG. 2 is an exploded view of Embodiment 1.
Figure 3:
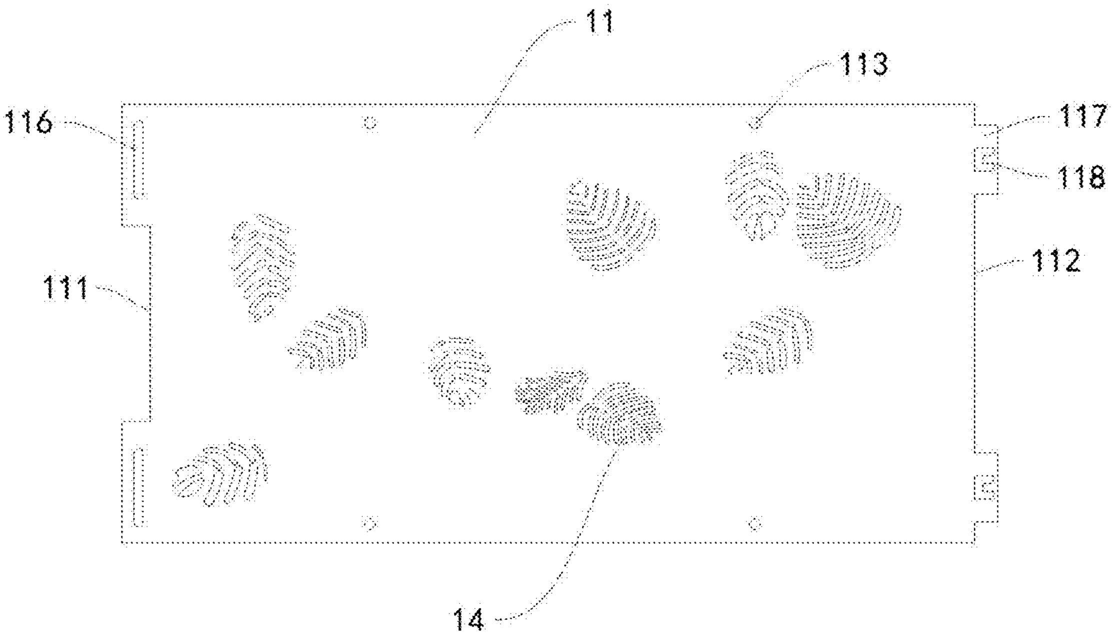
FIG. 3 is an unfolded view of the flexible metal plate in Embodiment 1.

As shown in FIGS. 1 to 3, a detachable and foldable assembled metal lamp shade is provided, which offers a protective performance while facilitating production and transportation, effectively reducing production and transportation costs. Additionally, it allows for quick and convenient assembly during use. The metal lamp shade in this embodiment includes a shade body 1, an end cover 2, and a handle 3. The end cover 2 can be fitted on the end of the shade body 1, and the handle 3 is connected to both sides of the shade body 1, thereby assembling the lamp shade. In this embodiment, the shade body 1 is a tubular structure formed by enclosing a single flexible metal plate 11, creating a space inside the shade body 1 for accommodating a lamp unit. The plate-like structure of the flexible metal plate 11 can be directly stamped during production, facilitating manufacturing. Additionally, it effectively reduces a transportation space occupied during transport, thereby lowering transportation costs. Specifically, as shown in FIGS. 2 and 3, the flexible metal plate 11 has vertical first and second side edges 111 and 112 on both sides in this embodiment. During assembly of the shade body 1, the flexible metal plate 11 can be bent around a vertical axis to bring the first and second side edges 111 and 112 close to each other and connect them, forming a tubular shade body 1 with openings at both ends. This assembly method is convenient. Moreover, edges of the first and second side edges 111 and 112 are provided with detachable buckle assemblies. Thus, after the flexible metal plate 11 is bent, the buckle assembly can be used to connect the first side edge 111 and the second side edge 112, ensuring that the flexible metal plate 11 remains in an enclosed state to form the shade body 1. Moreover, the first and second side edges 111 and 112 can also be detached using the buckle assemblies, enabling the shade body 1 to be disassembled into a flat flexible metal plate 11, for easy portability and transportation of the user.

Figure 4:
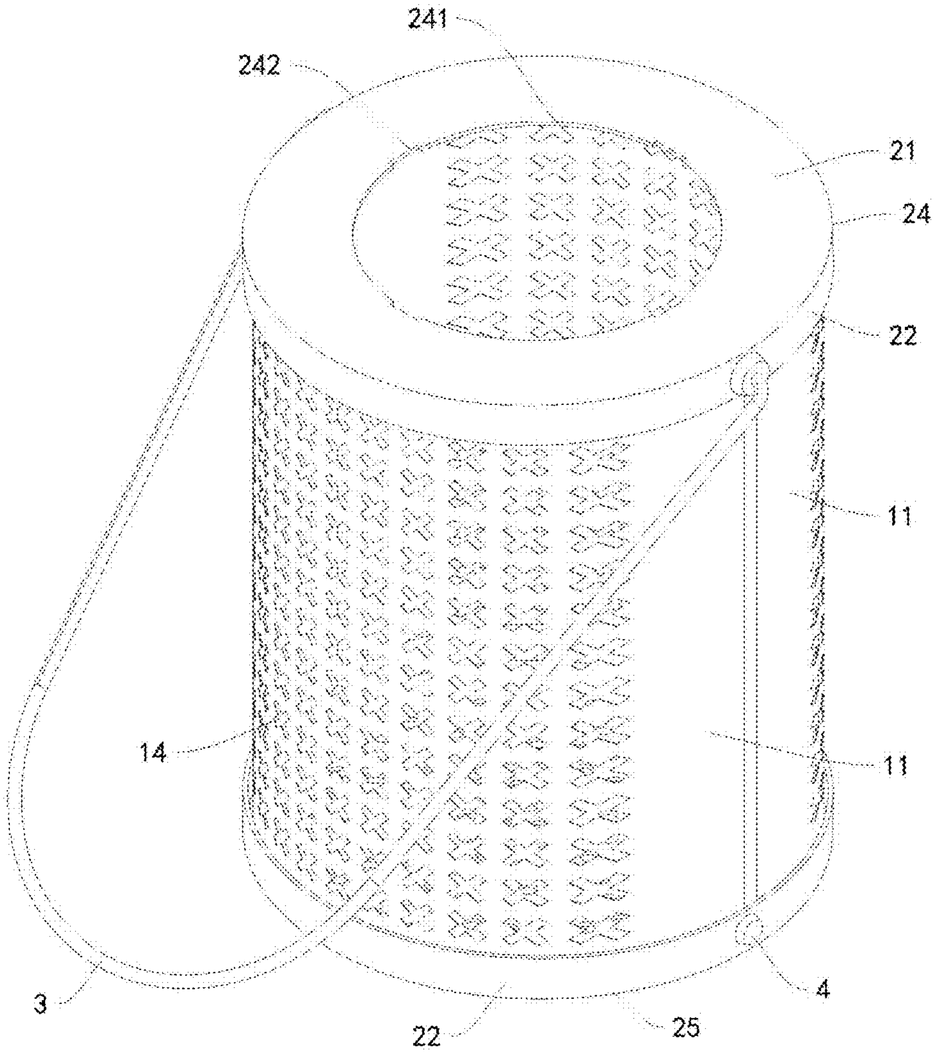
FIG. 4 is a schematic structural diagram of a lamp shade with two flexible metal plates.
Figure 5:
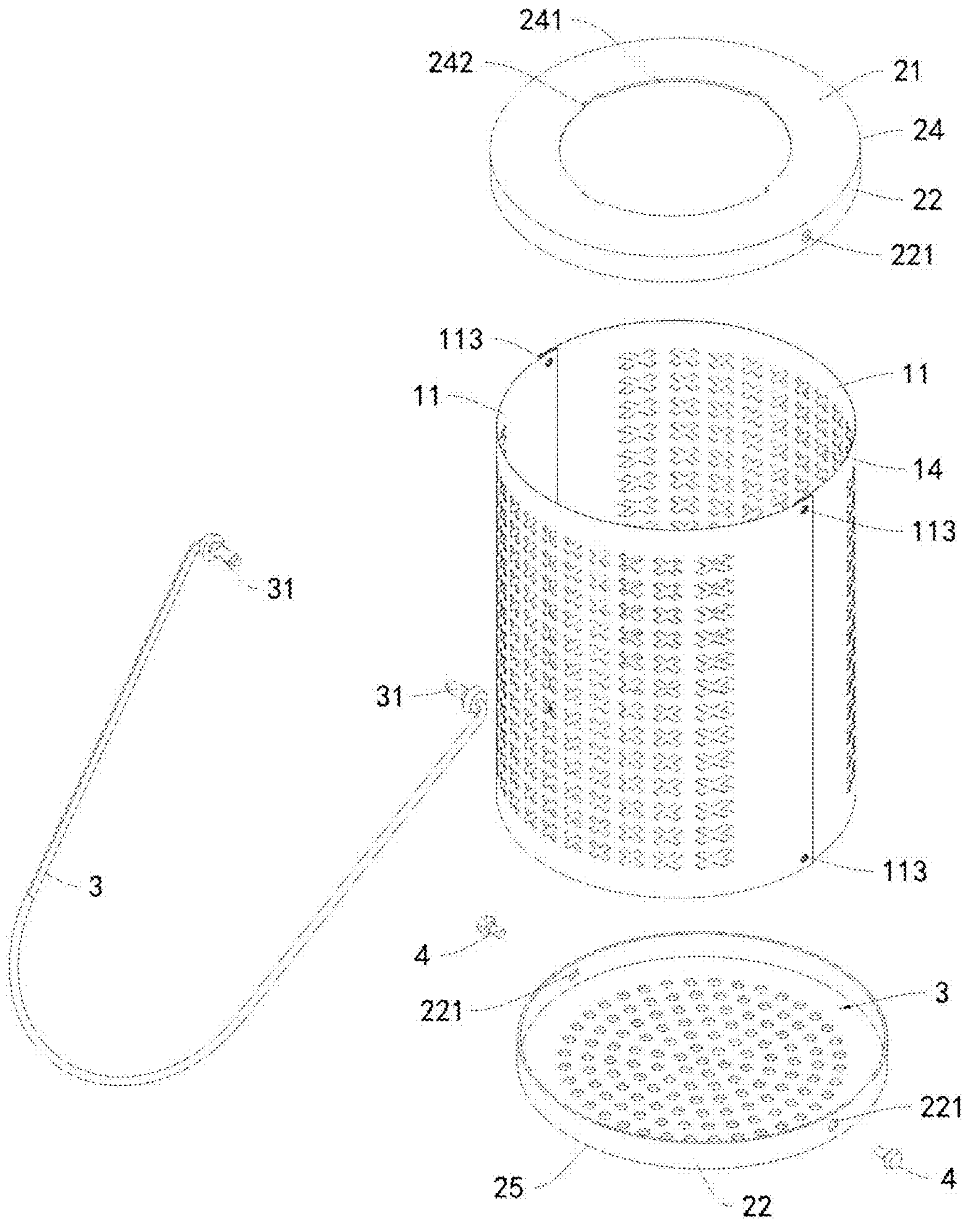
FIG. 5 is an exploded view of the lamp shade with two flexible metal plates.
Figure 6:
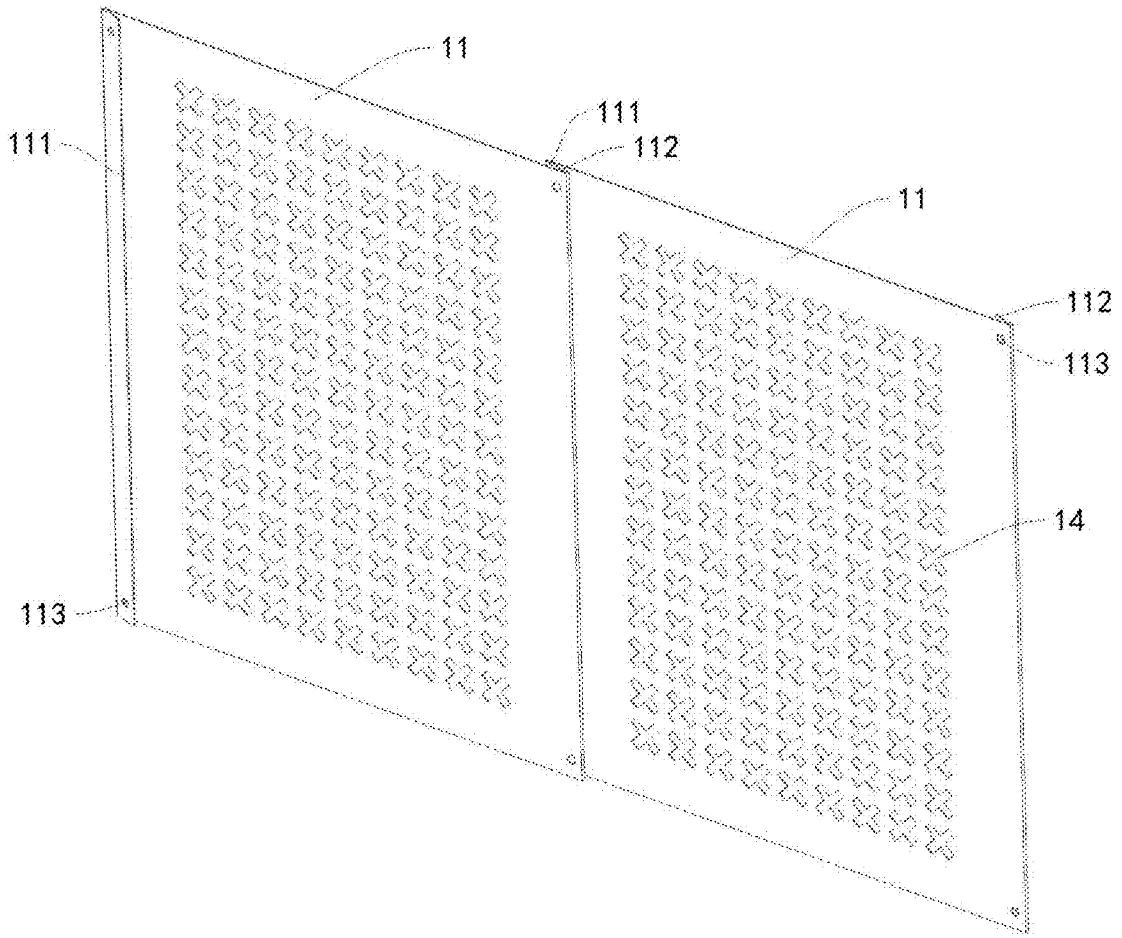
FIG. 6 is an unfolded view of the shade body formed by enclosing two flexible metal plates.

In other embodiments, the flexible metal plate 11 can also consist of multiple pieces. As shown in FIGS. 4 to 6, when the flexible metal plate 11 consists of two pieces, the first and second side edges 111 and 112 of each piece are folded toward opposite sides to form flanges. The two flexible metal plates 11 can then be connected by interlocking the flanges, enclosing to form a shade body 1 with openings at both ends. This design not only achieves the same technical effects as a shade body 1 formed by a single flexible metal plate 11 but also simplifies the assembly structure and process, making installation easier. It also allows users to choose an appropriate number of flexible metal plates 11 for personalized designs. As shown in FIGS. 3 and 6, to improve the stability of the shade body 1 formed by enclosing the flexible metal plate 11, the buckle assembly includes a connection port 116 on the edge of the first side edge 111 and a connection piece 117 on the edge of the second side edge 112 in this embodiment. The connection piece 117 corresponds to the connection port 116, allowing the connection piece 117 to be inserted into the connection port 116 when the flexible metal plate 11 is bent to enable that the first side edge 111 and the second side edge 112 are close to each other, thereby connecting the first and second side edges 111 and 112 and fixing the bent flexible metal plate 11 to maintain a shape of the shade body 1.

Additionally, the connection piece 117 is provided with a buckle portion 118 that reversely buckles to an edge of the connection port 116 in this embodiment. After the first and second side edges 111 and 112 are connected via the connection piece 117 and the connection port 116, the buckle portion 118 on the connection piece 117 can be reversely bent and buckled to the edge of the connection port 116, limiting a separation of the first and second side edges 111 and 112. This prevents the flexible metal plate 11 from rebounding to cause the shape body to break apart due to elastic potential energy, thereby improving the stability of the assembled shade body 1.

As shown in FIGS. 1, 2, 4, and 5, after the flexible metal plate 11 is enclosed, it forms a tubular shade body 1 with openings at both ends. To enhance the stability of the shade body 1 and improve the overall protective performance of the lamp shade, in this embodiment end covers 2 are fitted on the openings at both ends of the shade body 1. The end covers 2 close and lock onto the ends of the shade body 1, restricting the rebound of the flexible metal plate 11 and improving the stability of the assembled shade body 1. They also prevent external debris from entering the shade body 1 through the openings, which could affect the operation of the lamp unit installed inside.

Figure 7:
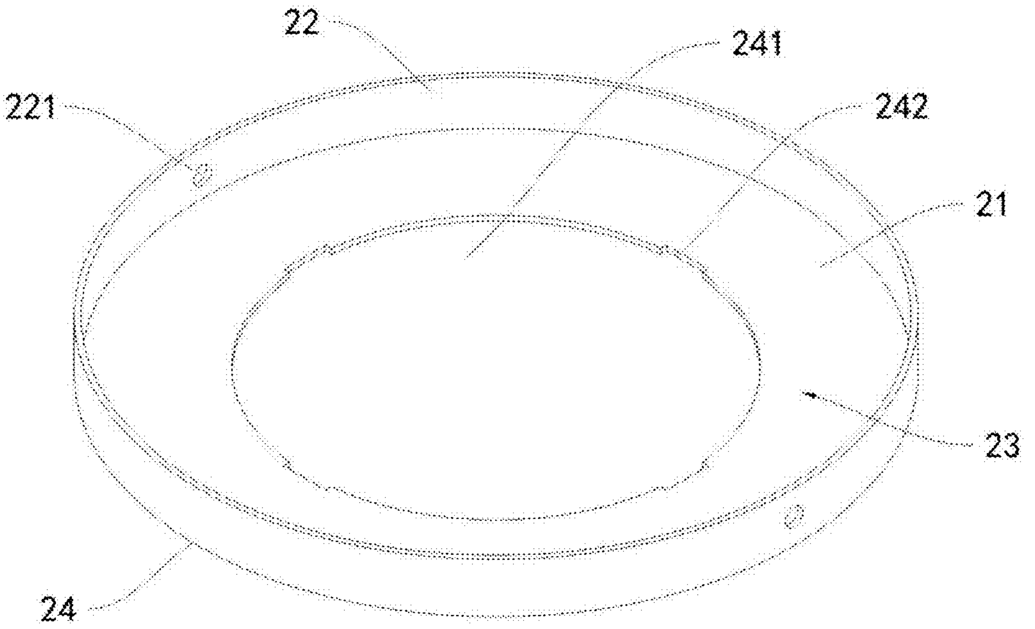
FIG. 7 is a schematic structural diagram of the top cover.

Specifically, as shown in FIGS. 2, 5, and 7, the end cover 2 in this embodiment includes a cover plate 21 and a side wall 22 surrounding a peripheral edge of the cover plate 21. The side wall 22 and the cover plate 21 form a fixing groove 23 that matches a cross-sectional structure of the shade body 1. When the end cover 2 is installed, the end of the shade body 1 is stably embedded in the fixing groove 23, ensuring the stable installation of the end cover 2 and locking the shade body 1 in place, thereby enhancing the stability of the assembled shade body 1.

Furthermore, the end cover 2 in this embodiment includes a top cover 24 and a bottom cover 25 based on their installation positions. The top cover 24 is fitted on the top opening of the shade body 1, and the bottom cover 25 is fitted on the bottom opening of the shade body 1. The cover plate 21 of the top cover 24 is provided with an installation port 241, allowing the lamp unit to be installed through the installation port 241 and extend into the shade body 1 when the lamp shade is used as a projection lamp. This installation method is convenient. Additionally, an edge of the installation port 241 is provided with positioning notches 242, ensuring correct and stable installation of the lamp unit when the lamp unit is installed. In other embodiments, the lamp shade can also be used as a candle holder. A candle can be installed in the fixing groove 23 of the bottom cover 25, placing it inside the shade body 1. This allows the lamp shade to serve as a candle holder with excellent visual appeal. The enclosed shade body 1 formed by the flexible metal plate 11 prevents the candle from igniting the structure, ensuring safety. When the lamp shade is used to hold a candle, the installation port 241 of the top cover 24 can be sealed with a cover to prevent the candle from being extinguished.

As shown in FIGS. 1 and 2, to facilitate users in hanging the lamp shade in a suitable position and carrying or moving it, the lamp shade in this embodiment is also equipped with a rigid or flexible handle 3. The flexible handle 3 is a rope connected to both ends of the top cover 24, allowing users to lift and use it. The rigid handle 3 is a metal strip with a projection surface of a semi-elliptical cross-section, which can be installed on the top cover 24 for users to carry. It also secures the top cover 24 and the enclosed shade body 1, enhancing the stability of the lamp shade.

Specifically, as shown in FIGS. 2 and 5, insertion heads 31 in this embodiment are provided with at both ends of the handle 3 that extend horizontally inward to the handle 3. First connection holes 221 are provided with the side wall 22 of the top cover 24 at corresponding positions, and the shade body 1 is provided with second connection holes 113 at positions corresponding to the first connection holes 221. During installation of the handle 3, the two insertion heads 31 can be inserted into the two first connection holes 221 which are provided opposite to each other and pass through the corresponding second connection holes 113, ensuring the stable installation of the handle 3. The handle 3 also secures the connection and fitting between the top cover 24 and the shade body 1, preventing the top cover 24 from falling off.

Additionally, as shown in FIGS. 2 and 5, to ensure a stable installation of the bottom cover 25, the side wall 22 of the bottom cover 25 is also provided with first connection holes 221. The bottom of the shade body 1 is provided with second connection holes 113 at positions corresponding to the first connection holes 221 of the bottom cover 25. In this embodiment the side wall 22 of the bottom cover 25 is provided with a connector 4 which is inserted into the first connection hole 221 and connected to the second connection hole 113, ensuring the stable installation of the bottom cover 25 at the bottom of the shade body 1 under the action of the connector 4.

As shown in FIGS. 1 to 6, the flexible metal plate 11 in this embodiment is provided with a hollow portion 14 for projection. After the flexible metal plate 11 is assembled into the shade body 1, decorative hollow patterns are formed on the surface of the shade body 1, enhancing the aesthetic appeal of the lamp shade. It also projects light, improving an overall practicality of the lamp shade.

Embodiment 2

Figure 8:
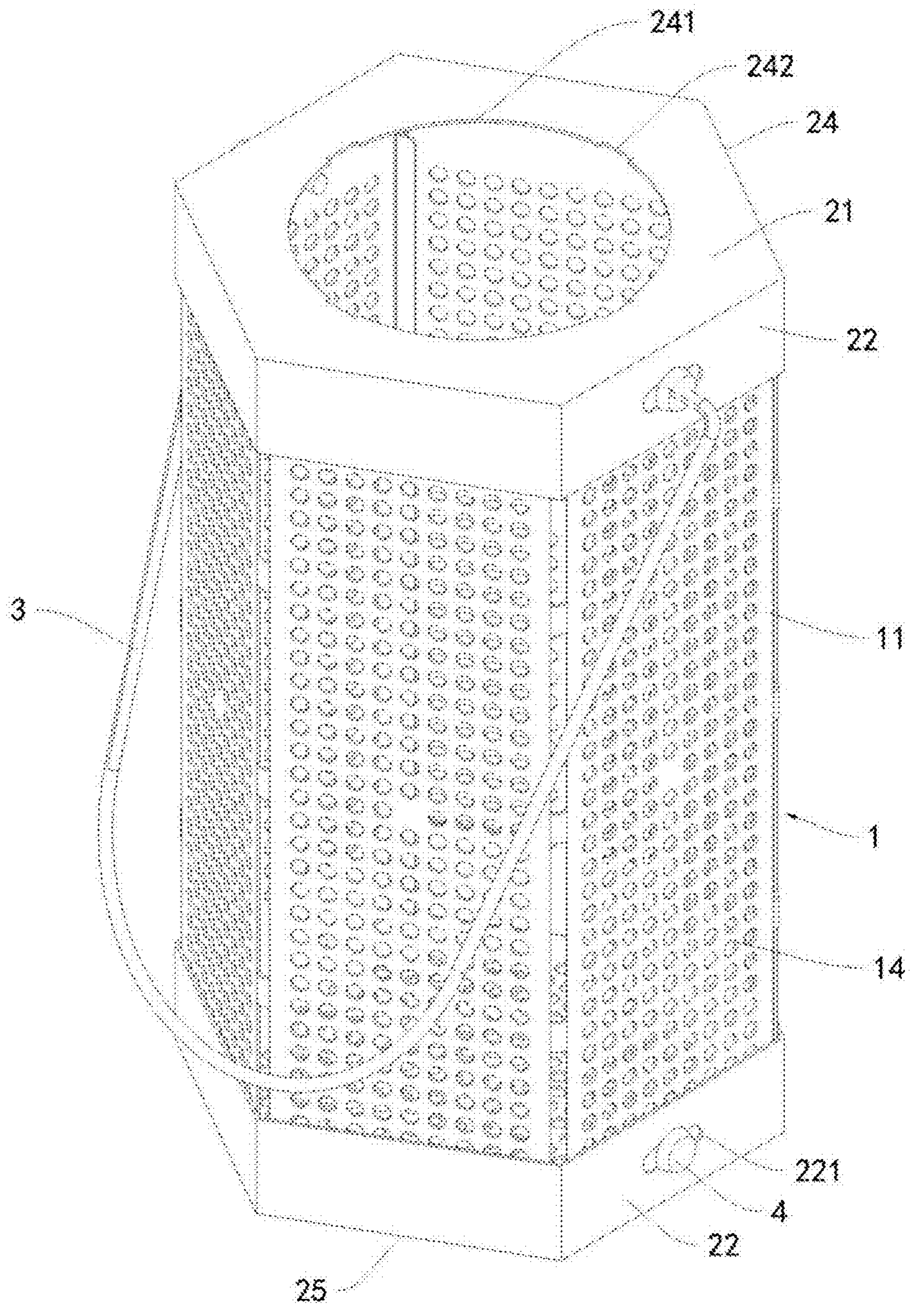
FIG. 8 is a schematic structural diagram of Embodiment 2.
Figure 9:
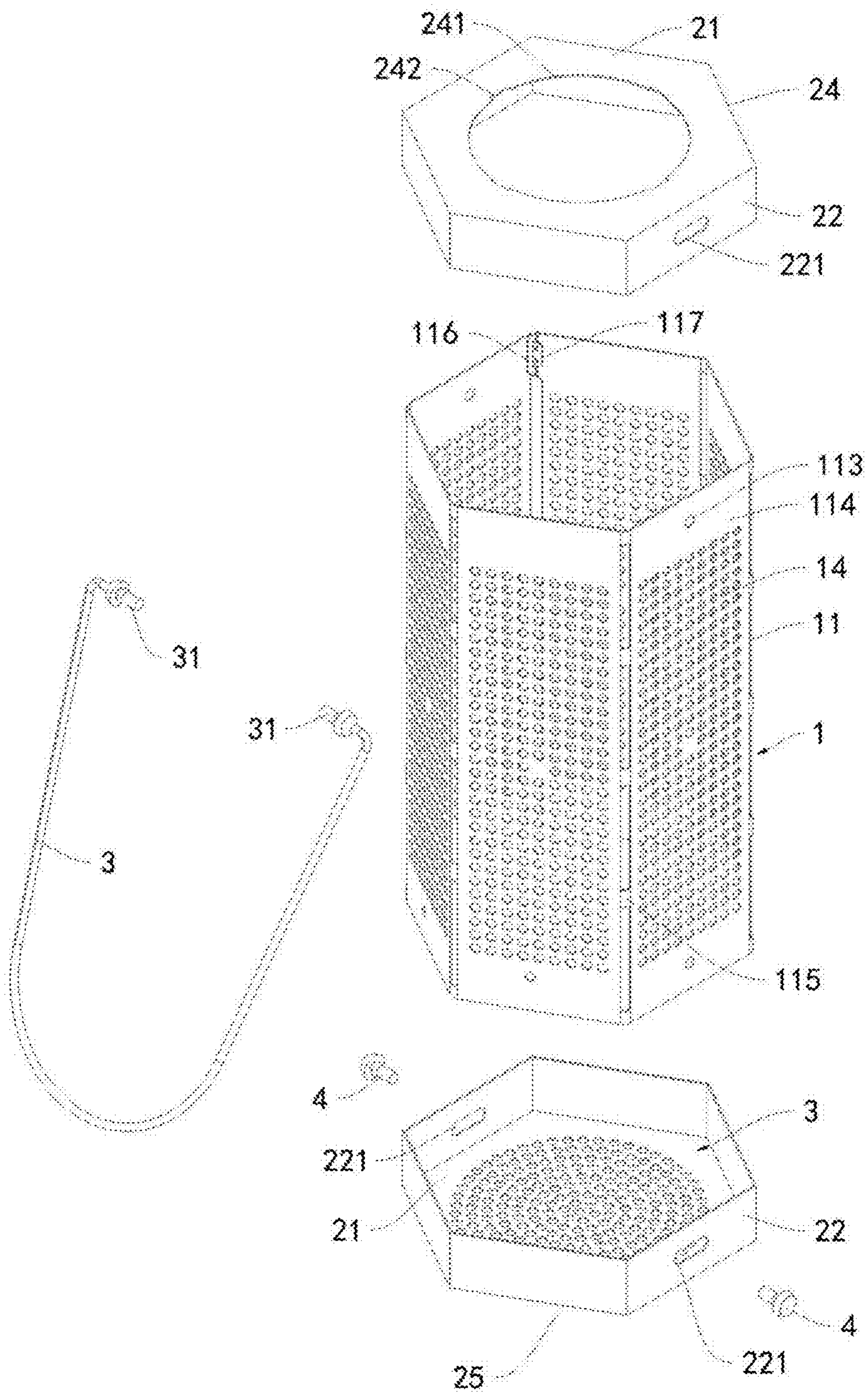
FIG. 9 is an exploded view of Embodiment 2.
Figure 10:
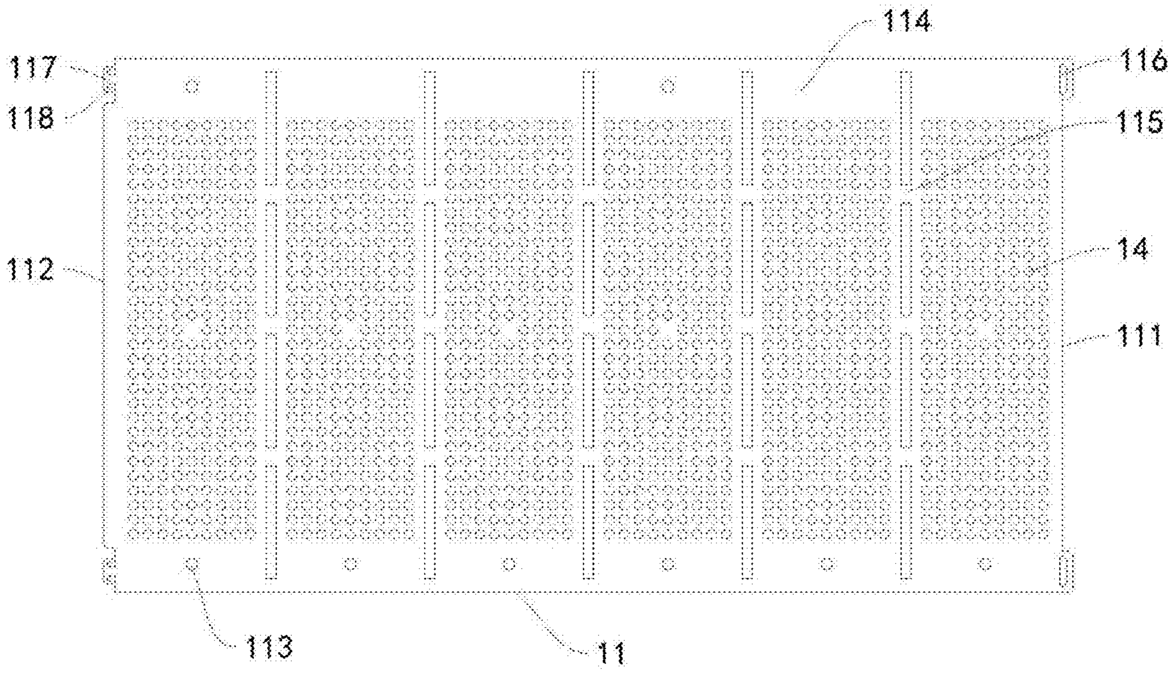
FIG. 10 is an unfolded view of the flexible metal plate in Embodiment 2.

As shown in FIGS. 8 to 10, a difference from Embodiment 1 is that the flexible metal plate 11 in Embodiment 2 includes at least three sequentially connected metal side plates 114. Adjacent metal side plates 114 of the least three metal side plates 114 are connected by flexible connecting ribs 115, allowing the metal side plates 114 to bend through flexible connecting ribs 115 and form a polygonal columnar shade body 1. Compared to the single flexible metal plate 11 in Embodiment 1, the method of multiple metal side plates 114 to bend through flexible connecting ribs 115 in Embodiment 2 improves the stability of the enclosed and assembled shade body 1 and facilitates diverse designs of the shape body 1.

In this embodiment, the flexible metal plate 11 consists of five metal side plates 114, forming a pentagonal prism shade body 1. In other embodiments, the flexible metal plate 11 can also consist of three, four, six, or eight metal side plates 114, allowing the assembled shade body 1 to take on triangular, quadrilateral, hexagonal, or octagonal prism structures, enriching the design of the shade body 1. As shown in FIGS. 9 and 10, the bottom of each metal side plate 114 in this embodiment is provided with a second connection hole 113, allowing the bottom cover 25 to be fitted onto the bottom of the shade body 1 at any angle, simplifying the assembly process of the lamp shade.

Embodiment 3

Figure 11:
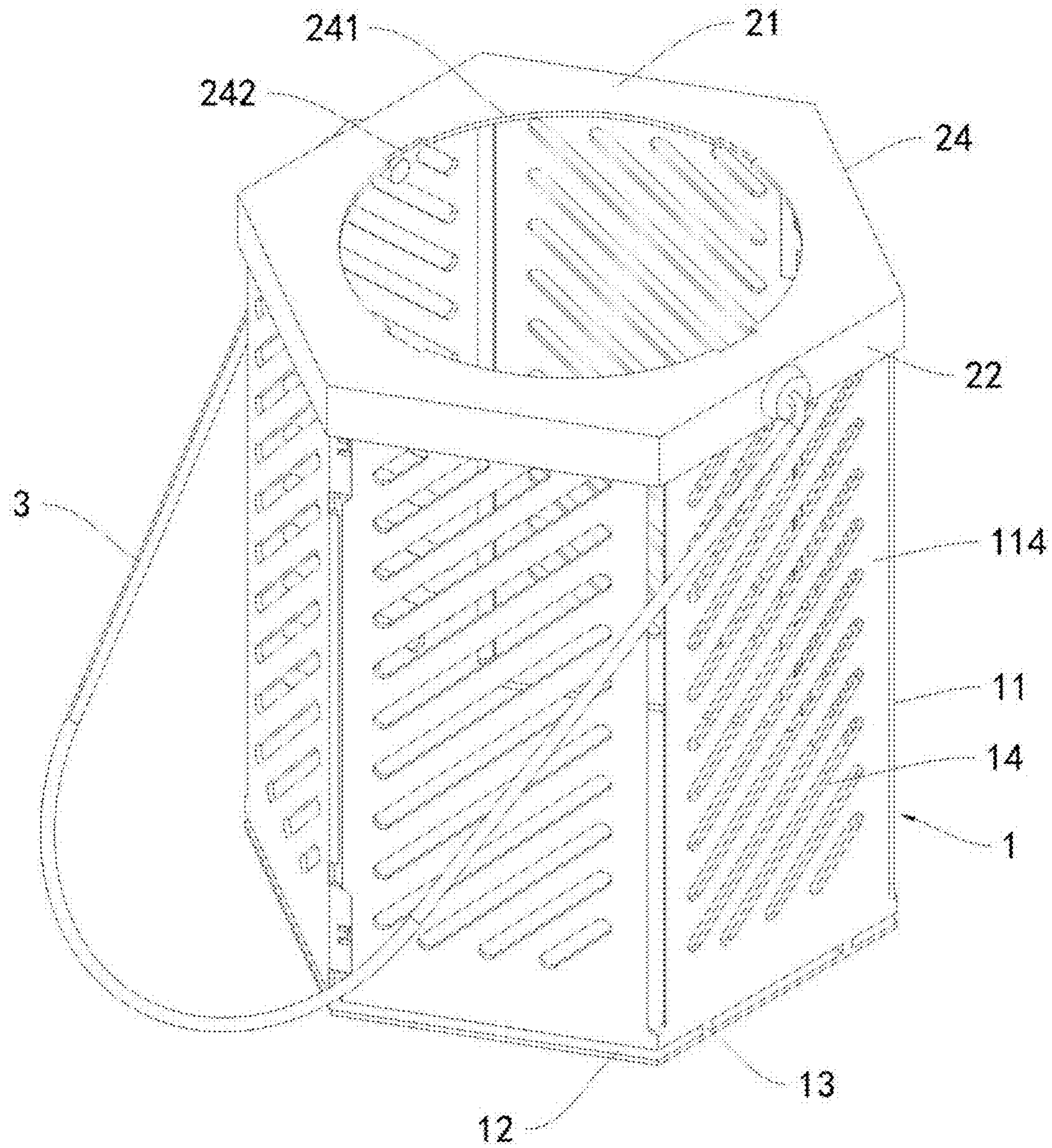
FIG. 11 is a schematic structural diagram of Embodiment 3.
Figure 12:
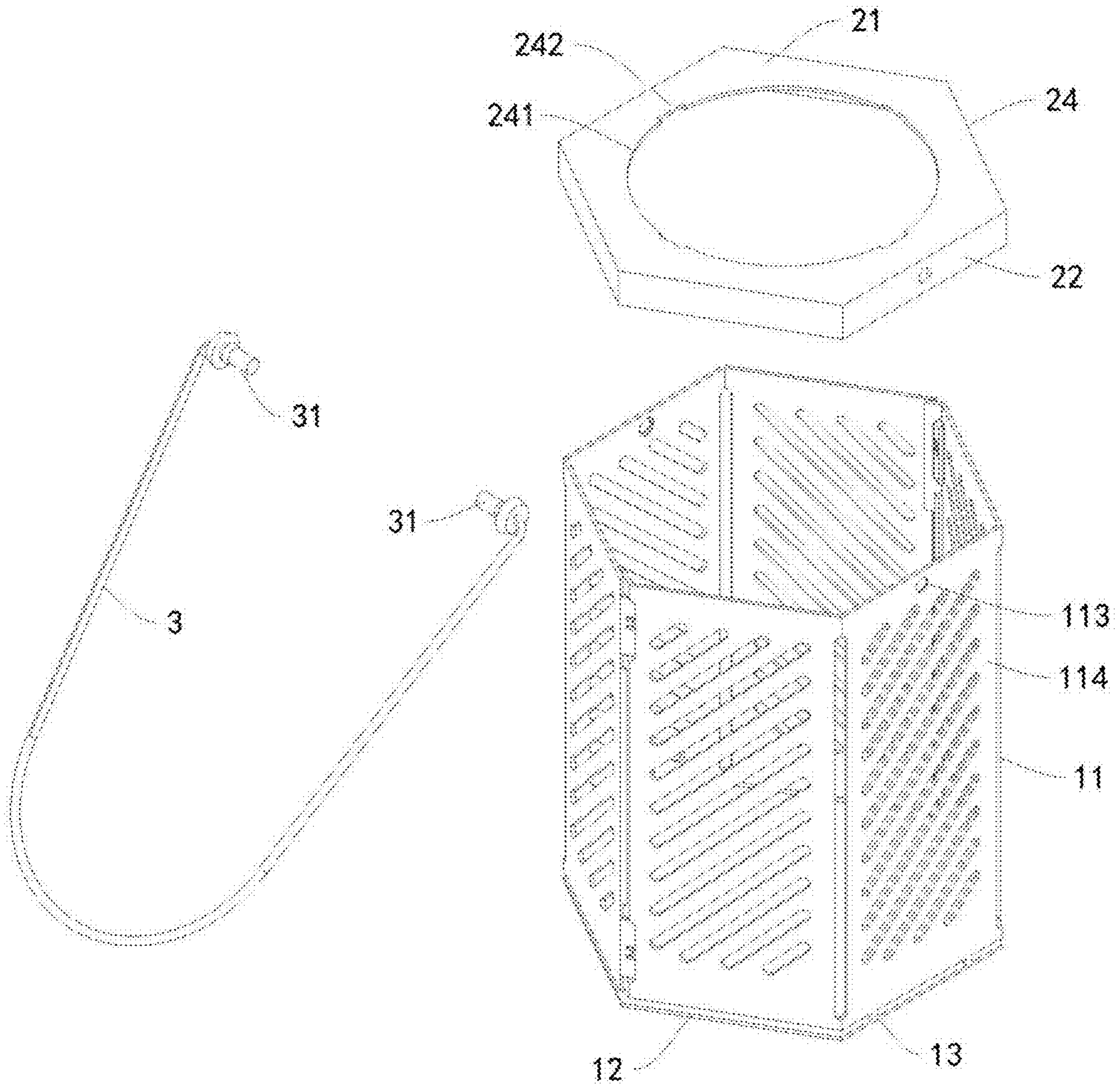
FIG. 12 is an exploded view of Embodiment 3.
Figure 13:
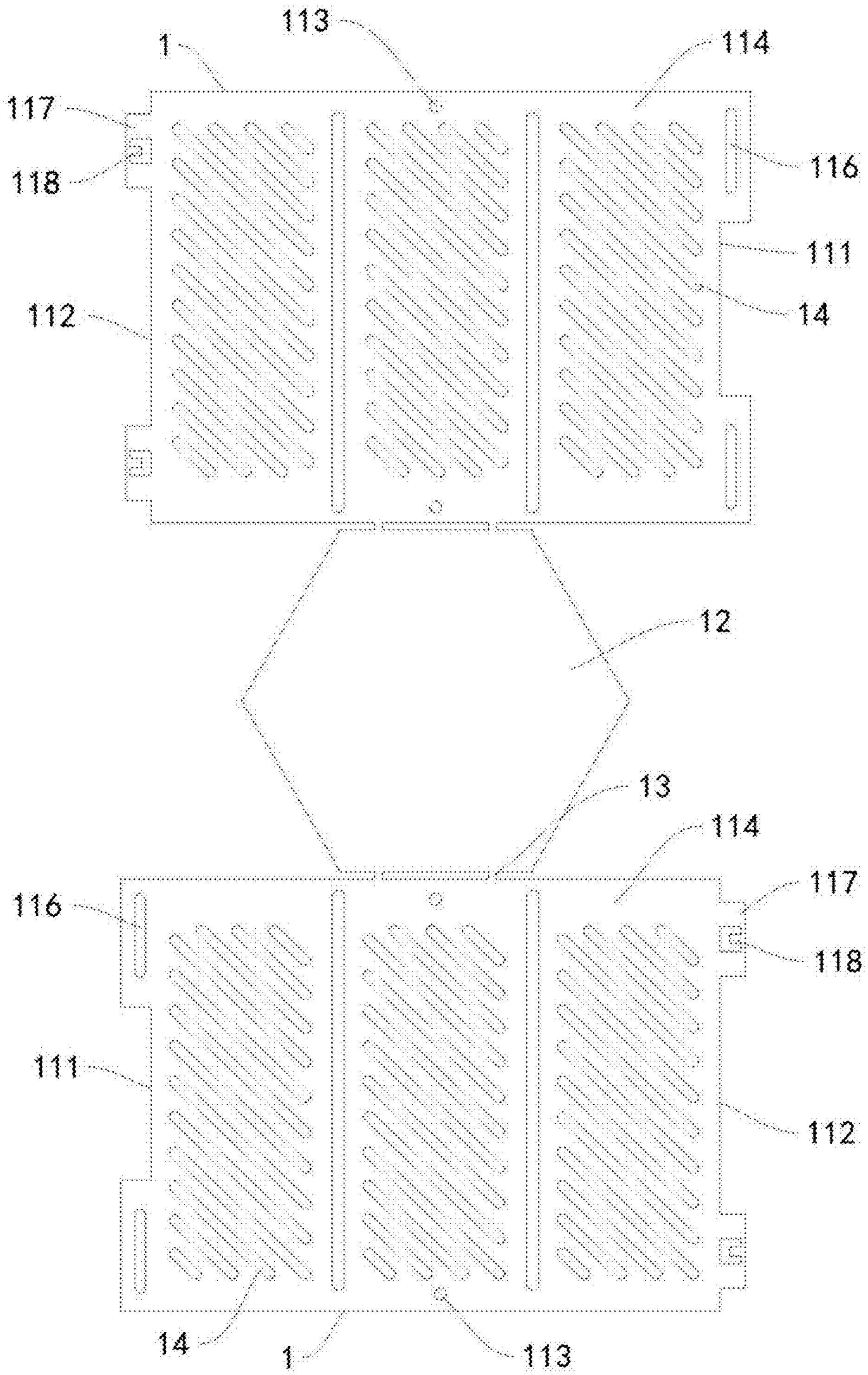
FIG. 13 is a schematic structural diagram of the shade body after being unfolded in Embodiment 3.

As shown in FIGS. 11 to 13, a difference from Embodiments 1 and 2 is that the shade body 1 in Embodiment 3 also includes a bottom support plate 12. Two flexible metal plates 11 are arranged on upper and lower sides or left and right sides of the bottom support plate 12. The flexible metal plates 11 and the bottom support plate 12 are connected by a connecting portion 13 for folding. During assembly of the shape body 1, the two flexible metal plates 11 can be bent to the same side of the bottom support plate 12 via the connecting portion 13, and the first and second side edges 111 and 112 of the two flexible metal plates 11 are connected to each other to form a shade body 1 with a top opening. This design achieves the same effects as Embodiments 1 and 2 without the need for installing a bottom cover 25, reducing an overall production and transportation costs of the lamp shade.

Additionally, as shown in FIG. 13, the flexible metal plate 11 in this embodiment includes three sequentially connected metal side plates 114, and the bottom support plate 12 has a hexagonal projection. During assembly of the shade body 1, the metal side plates 114 of the two flexible metal plates 11 can be bent to the sides of the bottom support plate 12, forming a shade body 1 with a hexagonal prism structure. This achieves the diverse design of the shade body 1 in Embodiment 2. In other embodiments, the flexible metal plate 11 can also consist of four, five, or six metal side plates 114 which are connected sequentially, and the bottom support plate 12 can have a polygonal projection of a polygonal structure with the same number of sides as the metal side plates 114 of the metal plate, forming the shade body 1 with an octagonal, decagonal, or dodecagonal prism structure.

In summary, this embodiment achieves an assembled lamp shade with good protective effects by arranging a shade body 1 formed from spliced flexible metal plates 11. The flexible metal plates 11 can be directly stamped during production, facilitating manufacturing. The plate-like structure of the flexible metal plates 11 effectively reduces the transportation space occupied, facilitating transport. By providing detachable first and second side edges 111 and 112 on both sides of the flexible metal plate 11, the flexible metal plate 11 can be assembled into the shade body 1 through a connection of the first and second side edges 111 and 112. This assembly method is convenient, and the shade body 1 can be disassembled into flexible metal plates 11 for easy transport. Additionally, by setting the end cover 2 to be fitted on the ends of the shade body 1, the shade body 1 is fixed, improving the stability of the shade body 1 assembled by the flexible metal plates 11. The end cover 2 also protects the interior of the shade body 1, enhancing the overall protective performance of the lamp shade.

The above-described embodiments are merely preferred implementations of the invention and should not be construed as limiting the scope of protection of the invention. Any non-substantial changes or modifications made by those skilled in the art based on the invention fall within the scope of protection of the invention.

What is claimed is:

1. A detachable and foldable assembled metal lamp shade, comprising:

a shade body (1), which is a tubular structure provided with a top opening or openings at both ends, including at least one flexible metal plate (11), wherein first and second side edges (111, 112) are vertically disposed on both sides of the flexible metal plate (11), and the first and second side edges (111, 112) are detachably connected to enclose the flexible metal plate (11) to form the shade body (1);

an end cover (2), which is fitted on the opening at the end of the shade body (1), wherein the end cover (2) includes a cover plate (21) and a side wall (22) surrounding a peripheral edge of the cover plate (21), the side wall (22) and the cover plate (21) form a fixing groove (23) that matches a cross-sectional structure of the shade body (1), and an end of the shade body (1) is embedded in the fixing groove (23);

a handle (3), which is a rigid or flexible structure with flat insertion heads (31) at both ends, wherein first connection holes (221) are provided at corresponding positions of the side wall (22), and the shade body (1) is provided with second connection holes (113) at positions corresponding to the first connection holes (221), and the insertion heads (31) are sequentially inserted into the first and second connection holes (221, 113).

2. The detachable and foldable assembled metal lamp shade according to claim 1, wherein the flexible metal plate (11) includes at least three sequentially connected metal side plates (114), with flexible connecting ribs (115) provided between two adjacent metal side plates (114) of the at least three metal side plates (114) for connection and bending of two adjacent metal side plates (114).

3. The detachable and foldable assembled metal lamp shade according to claim 1, wherein the shade body (1) further includes a bottom support plate (12), wherein two flexible metal plates (11) are arranged opposite to each other on upper and lower sides or left and right sides of the bottom support plate (12), a connecting portion (13) for folding is connected between the flexible metal plates (11) and the bottom support plate (12), and during assembly of the shade body (1), the two flexible metal plates (11) are folded onto a surface of the bottom support plate (12) and are connected to each other to form the shade body (1) with a top opening.

4. The detachable and foldable assembled metal lamp shade according to claim 1, wherein edges of the first and second side edges (111, 112) are provided with a buckle assembly for mutual connection.

5. The detachable and foldable assembled metal lamp shade according to claim 4, wherein the buckle assembly includes a connection port (116) on the first side edge (111) and a connection piece (117) on the second side edge (112), wherein the connection piece (117) corresponds to the connection port (116), and during assembly of the shade body (1), the connection piece (117) is inserted into the connection port (116).

6. The detachable and foldable assembled metal lamp shade according to claim 5, wherein the connection piece (117) is provided with a buckle portion (118) for reversely buckling into the connection port (116).

7. The detachable and foldable assembled metal lamp shade according to claim 1, wherein the end cover (2) includes a top cover (24) fitted on top of the shade body (1) and a bottom cover (25) fitted on bottom of the shade body (1), wherein the handle (3) is connected to both sides of the top cover (24), and a side wall (22) of the bottom cover (25) is provided with a connector (4) inserted into the first connection hole (221) and connected to the second connection hole (113).

8. The detachable and foldable assembled metal lamp shade according to claim 7, wherein an installation port (241) is provided on a surface of the cover plate (21) of the top cover (24).

9. The detachable and foldable assembled metal lamp shade according to claim 8, wherein an edge of the installation port (241) is provided with positioning notches (242).

10. The detachable and foldable assembled metal lamp shade according to claim 1, wherein a hollow portion (14) for projection is provided through a surface of the flexible metal plate (11).

* * * * *